May 19, 1925.                                                    1,538,250
W. J. LOVE, JR
MEANS AND METHOD OF CALCULATING MONETARY VALUE OF ELAPSED TIME
Filed April 7, 1922        2 Sheets-Sheet 1
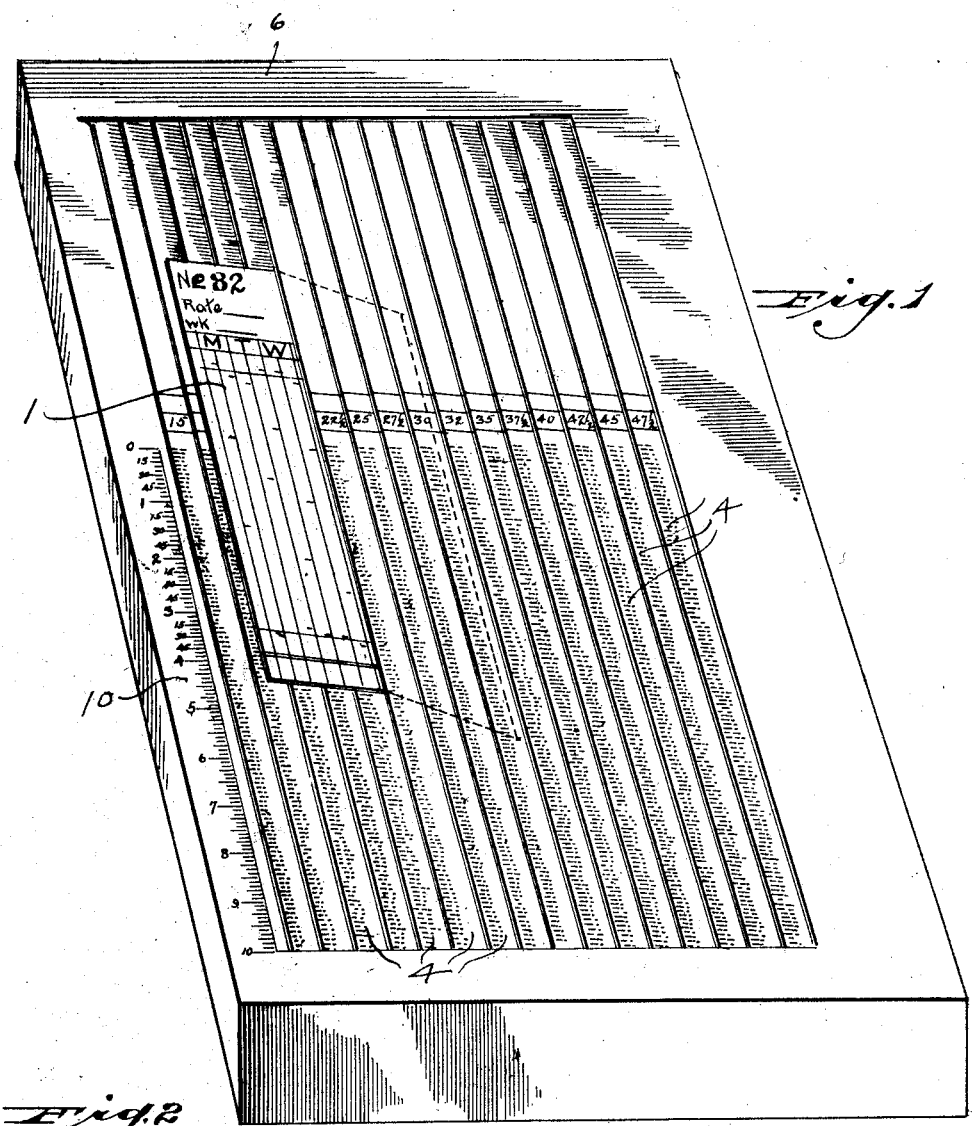
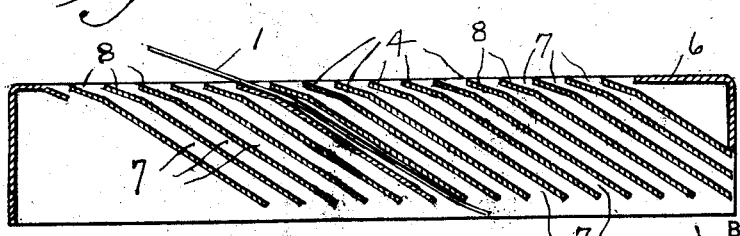
INVENTOR
ATTORNEY May 19, 1925.

W. J. LOVE, JR 1,538,250

MEANS AND METHOD OF CALCULATING MONETARY VALUE OF ELAPSED TIME

Filed April 7, 1922   2 Sheets-Sheet 2

Patented May 19, 1925.

1,538,250

UNITED STATES PATENT OFFICE.

WILLIAM J. LOVE, JR., OF PIQUA, OHIO.

MEANS AND METHOD OF CALCULATING MONETARY VALUE OF ELAPSED TIME.

Application filed April 7, 1922. Serial No. 550,359.

*To all whom it may concern:*

Be it known that I, WILLIAM J. LOVE, Jr., a citizen of the United States, residing at Piqua, in the county of Miami and State of Ohio, have invented certain new and useful Improvements in Means and Methods of Calculating Monetary Value of Elapsed Time, of which the following is a specification.

My invention relates to computing and calculating devices and more particularly to means for calibrating time and cost sheets, by computing time in units of money value.

The present invention contemplates a measuring or scaling apparatus by which periods of elapsed time as indicated upon time cards for cost accounting records by proportionately spaced imprints, punchings, indentations or other markings may be at once translated into equivalent units of monetary value without mathematical calculation.

It is quite common in industrial and commercial institutions to employ individual time cards, upon which the daily period or periods of employment are recorded by the employee "punching" a time recorder clock in which the card has been inserted, at the time of arrival and departure of such employee, which indicates upon the time card, such times of operation as "In" and "Out." Between the time of such registrations, the recorder clock has automatically changed the stop or guide means by which the time is relatively located in relation with the printing devices, whereby the spacing between successive registrations will uniformly agree with the period of elapsed time. That is to say, the spacing between such registrations will be proportionate to the time period. In other systems of time and cost accounting, the employee is required to register upon his time card, the time of commencement and finish of each successive assignment or "job." The time recorder clock in the meantime automatically changed the card locating stop in relation with the printing mechanism; the spacing of these successive registrations will be proportionate to the intervening interval of time. Inasmuch as the time recorder mechanisms commonly employed make the successive registrations in figures representing hours and minutes, the present practice is for the cost accountant or time keeper to ascertain the extent of the intervening or elapsed time period by subtracting the hours and minutes indicated by these successive registrations and then by multiplying the hours and fractions thereof, of the elapsed time period by the rate of pay per hour, to ascertain the employee's pay, or the labor cost of a particular operation. Such mathematical calculations not only consume a great deal of time, but the amounts are not readily nor accurately ascertained by persons unskilled in such mathematical computations, especially when both the hours and minutes and the rate of pay involve odd numbers, or fractions. Many of the time recorder devices now in use are adapted to imprint, mark, punch or otherwise indicate upon individual time cards, which the operator inserts in the recorder apparatus before actuating the same. The degree to which the card is insertable or its relative location with the printer means of the recorder device is determined by automatically movable stops, actuated by the clock work mechanism. The present invention contemplates means for which such time cards may be viséed and the time periods represented thereon by successive imprints or other indications be at once turned into equivalent units of money value without mathematical calculation and at any one of a number of different rates of pay per hour or per day.

The object of the present invention is to simplify and minimize the mode of computing elapsed time in units of money value, and to provide a simple, cheap and economical apparatus for performing such computations, which will not only be accurate in its determination, but may be easily and quickly operated to ascertain money values of different periods of time at different rates of pay by persons unskilled by mathematical calculations.

A further object of the invention is to provide a scale divided into units of money value for ascertaining the value of elapsed periods of time, particularly for use in cost accounting and pay-roll computation.

A further object of the invention is to provide an improved form of employee's time card on which to record in sequence the period of employment, with the commencement and finish of successive employment periods, work assignments, or "jobs," relatively spaced in proportion to the intervening period of elapsed time.

With the above primary and other incidental objects in view as will more fully appear in the specification, the invention consists of the features of construction, the parts and combinations thereof and the mode of operation or their equivalents as hereinafter described and set forth in the claims.

Referring to the drawings, Fig. 1 is a perspective view of the calibrating or computing device for ascertaining the money value of elapsed periods of time at different rates of pay, of different employee's time card. Fig. 2 is a transverse sectional view of the scaling or calibrating device shown in Fig. 1. Fig. 3 is a face view of an employee's time card, showing thereon the imprint or marking of successive work assignments or jobs. Fig. 4 is an enlarged detail view of one of the scales or blades from the computing device.

Like parts are indicated by similar characters of reference throughout the several views.

In the accompanying drawing, wherein is shown the preferred, but obviously not the only form of embodiment of the invention, 1 is an individual time card or record sheet, upon which are recorded, the successive periods of employment, or the starting time and time of completion. While this time card may be of any suitable type or form, and may be of only one day capacity, in the present instance the card is shown divided into seven double columns, one double column for each day of the week and designated by the initial letters of the day. The first column of each double column division is devoted to record of time during the morning hour, or morning work period, while the second column of each double column period, pertains to the afternoon period. At the top of the card is provided any suitable identification data such as the employee's name and an access or record number, his rate of pay, and such other information as may be convenient or useful to the time keeper or accountant. The time recorder device is automatically adjusted to print successively in spaced relation in the respective columns, the intermediate spacing between successive imprints being proportionate to the period of elapsed time. The time recorder, gage or guide stops within which the card is inserted by the employee, preparatory to imprinting thereon, are adjusted daily to insure the printing or marking in the proper column according to the day of the week.

The time card or ticket 1 is preferably though not necessarily provided adjacent to the top with a transverse line 2, representing the starting time and adjacent to the bottom of the card, it is provided with a second line 3, representing the quitting time. These lines may be differently spaced according to the established hours of employment. As is the usual established rule in industrial and commercial institutions, no allowance is made for that portion of the recorded period prior to the established starting time. Thus if the starting time is seven o'clock a. m., and the employee registers "In" at six forty-five a. m., the time is computed from the line 2, representing the starting time, rather than from the recorded time. The same thing is true relative to the line 3, indicating the quitting time. Any "Out" registrations below this line are not considered nor computed, unless the employee is working on an overtime arrangement, in which case the overtime is computed from such line 3. When working upon a piece work basis, or under conditions where labor costs are to be accurately computed, the employee will insert his time card 1, in the time recorder apparatus, and mark or imprint thereon the time of starting and finish of each job, or work assignment. The spacings of such recorded indications, imprints, indentations, punchings, or other markings, representing the beginning and completion of work periods, whether pertaining to individual "jobs" or work assignments, or otherwise, being proportioned to and in exact agreement with the relative periods of elapsed time, the cost accountant may compute the time intervals in hours and minutes, and then by multiplication, ascertain the amount due the employee for such period or the cost of any work, assignment, or "job" in accordance with the rate paid per hour, indicated at the top of the employee's time card.

Instead of going through the necessary mathematical computations to ascertain first, the hours and minutes of elapsed time, and then the monetary value of such period at the prescribed rate per hour, the present invention is intended to indicate at once to one who may be unskilled in such mathematical calculations, the monetary value of the different periods of elapsed time, appearing upon the time card or ticket.

To this end there is provided for each different hourly rate of pay or rate of pay per day as the case may be, a different scale 4 (Fig. 1).

Such scales are calibrated in different units of monetary value, or rather in units of different monetary value extended upon the scale, in accordance with the relative spacing of the recorded imprints or registrations upon the time card. Each of these scales 4 is divided into divisions or degrees, having extent equivalent to the hours and minutes of the spacing employed by the time recorder apparatus, and imprinted upon the time card 1. For convenience of illustration, there has been shown in the first column of the time card 1 by dotted lines, the equivalent hours and minutes between successive time record imprints. It will be understood that such a scale may be made to appear upon the card, but is not necessarily placed thereon, and in fact is preferably omitted since it performs no useful function. In the drawing, for illustrative purposes, the elapsed time period has been shown upon this dotted line scale, divided into five minute intervals. The different scales 4, are all divided in units or divisions of equal extent. However, instead of representing these units upon the scales 4, as five minute intervals, or twelfths of an hour, they are represented in monetary value at different prescribed rates of pay.

Assuming for convenience of easy computation, that the rate of pay is sixty cents per hour, then each such division or degree upon the corresponding scale 4, will represent five cents, instead of five minutes. If the rate of pay is thirty cents per hour, the degrees or divisions of the graduated scale 4, pertaining to this rate of pay will represent two and one half cents each. If the rate of pay is but fifteen cents per hour, then each division or unit of measurement upon the scale 4 corresponding to this rate of pay will represent one and a quarter cent, the other rates of pay as for instance, seventeen and a half cents, twenty-two and three quarters cents, nineteen and one quarter cent, etc., are represented in like manner, the lineal extent of the units or divisions of measurement being exactly the same, on each of the scales, but the figures representing the monetary values, thereof differing in accordance with proportionate part of the rate of pay per hour.

By measuring the spacing or distance between the imprints upon the time cards 1, with the corresponding monetary value scale at the equivalent rate per hour, it is quite easy to ascertain at once, the total of pay or the labor cost for such period of employment, without performing the usual mathematical calculations of subtraction to find the hours and minutes of elapsed time, and then multiply the hours and minutes by the rate of pay to find the monetary value thereof. Thus in Fig. 2 by measuring the spacing or distance between the time imprint 7.10 in the first division of the double column under T, representing Tuesday a. m., and the imprint 11.35 in the same column representing the completion of the work assignment, by applying thereto the scale 4, corresponding to the rate of pay of thirty cents per hour, it is at once ascertained that the employee is entitled to pay of one dollar and thirty-two and a half cents for this period. This is done by applying to the time card the scale 4 having calibrations and degrees thereof, marked in fractional parts and multiples of thirty cents per hour. By applying the zero point or starting point of such scale to the recorded imprint of 7.10 a. m., it will be found that the scale marking or monetary value of the division falling exactly opposite the imprint 11.35 will be one dollar and thirty-two and one half cents. If instead of being employed at a rate of thirty cents per hour, this employee worked at seventeen and one half cents per hour, it is only necessary to apply to the time sheet or card 1, the particular scale 4, corresponding to seventeen and one half cents per hour. If the zero or starting point on the scale is applied at the 7.10 registration, the total monetary value for such period will be found opposite the succeeding registration 11.35, without the necessity of subtracting to ascertain the number of hours and minutes and then multiplying by seventeen and one half, to obtain the amount of pay due. It is only necessary to apply the scale and immediately read off the total of pay due the employee for the recorded work period, or the labor cost of such operation. Likewise where the work is charged to a customer at a prescribed rate of pay greater than that due the employee as is usual in industrial establishments, this charge amount may likewise be obtained by applying the corresponding scale to the time card indication, which scale may differ from that of the rate of pay scale of the operator, but be divided in identical units or degrees, but bearing monetary values at a higher rate.

While the time clerk or accountant might have at hand a number of independent or separate scales, each having thereon degrees or divisions of measurement of equal extent corresponding to the time intervals of the record card, but bearing monetary values of such time intervals at different pay per hour, and by selecting the proper scale or monetary value indicator, he can ascertain the value of different "jobs" or assignments of different operators, working for different rates of pay per hour, the scales have been shown in Fig. 1, conveniently arranged to economize time, in selection of the proper scale and facilitate the calibration of different operator's time card at different rates of pay per hour, or per day as the case may be.

In this multiple scale computing device, illustrated in Fig. 1, the monetary or value scales 4, are arranged in parallel spaced relation within a supporting frame or housing 6. The scales 4 extending longitudinally in parallel relation within the frame or housing 6 are inclined laterally in overlapping spaced relation as shown more particularly in the sectional view Fig. 2. There is thus provided between the succeeding scales 4, intervening spaces, or slots 7, within which one side margin of the time card 1 may be inserted to bring the desired daily record column in juxtaposition to the graduated edge of the selected scale 4. It will be understood that the different scales making up this multiple calibrating device, have thereon divisions or degrees of equal extent as before mentioned, but each carry different series of value figures indicative of monetary values of these divisions or degrees of measurements at different rates of pay per hour or per day. To facilitate the reading of the value figures thereon, the marginal edges of the laterally inclined scales 4 are deflected or bent laterally to prevent the graduated portion in a more nearly horizontal position, as shown at 8, in Fig. 2.

With the multiple calibrating device shown in Fig. 1 before him, the accountant will insert the time card 1 beneath the selected scale corresponding to the hourly rate of pay of the employee whose time card is being viséed, until the particular daily record to be computed is brought into juxtaposition to the edge of the corresponding scale. For instance, in Fig. 1, the time card has been shown inserted to such an extent as to bring the Wednesday afternoon record column closely to the edge of the selected scale 4. In this position, the excess portion of the card to the right of the column being viséed projects within the space 7, intermediate the succeeding scales 4, as is shown in Fig. 2. Having brought the particular column to be computed into proximity to the corresponding value scale 4, the accountant then slides the card longitudinally between the scales, until the starting time imprint upon the card is brought into registry with the starting point or zero mark upon the scale. By then observing the money value figures of the scale division in registry with the imprint of the quitting time or completion of the work or assignment, as it appears upon the card, the value of such elapsed time period is instantly obtained. If the cost of several "jobs" or work assignment during any half day work period is to be ascertained the first period is measured as before described. Then the card is shifted longitudinally upwardly, bringing the beginning time of the second work assignment into registry with the starting point or zero point upon the scale, and the completion time of such assignment will be found opposite the equivalent money value indication upon the scale for the elapsed time period. By shifting the card upward further, the successive work assignments or "jobs" may be computed, by bringing the starting time of each assignment or job into registry with the starting or zero point upon the scale and observing the monetary value indication on the scale opposite the time of completion. It is to be noted in Fig. 1 that the graduation and values upon the scales have their beginning at a mid length point, leaving the upper portions of the scales blank. This positioning of the graduations and monetary values upon the scales is for the purpose of enabling the time card 1 to be shifted upwardly within the frame or housing 6, a distance sufficient to bring the final or last work assignment or "job" of the day into position to be computed with its beginning time in registry with the zero mark upon the scale. The blank extremities at the upper ends of the scales thus affords sufficient clearance for the time cards, when adjusted to this extreme position.

As a matter of convenience although not by any means a necessity, a scale 10 of hours and minutes may be placed upon the frame 6 of the computing device, such scale being located in registry with the division or degrees of the monetary value scales 4.

After taking off the time or money value for successive assignments or jobs, which it may be desired to keep separately, the accountant or bookkeeper can then prove these computations or get the total of the operator at the prescribed wage per hour, by again bringing the initial starting point indication upon the time card, whether the same be the established line 2, for the day's work, or the recorded time subsequent thereto, into registry with the zero point or starting point upon the monetary value scale, and then reading the amount opposite the last indication or opposite the line 3, representing the quiting time in the event that the last indication is beyond such line, disregarding intermediate indications. This will not only serve to prove jobs or labor costs computations for individual work assignments, but will also give at once the amount of pay due the operator.

In the use of this system, it is very convenient and a simple matter to draw the time card in any particular column an ink line as at 11, to indicate some starting or quitting time as when the factory or commercial institution has been closed because of a part holiday or due to some breakdown of power transmission or dismissal of the working force for a part of the ordinary work period for any reason. Such special line 11, drawn upon the time card may then be used for computing purposes in the same manner as lines 2 and 3 are utilized as the starting or quitting time, no allowance being made for registrations "In" or "Out" before or after the starting or quitting time so indicated.

The particular time recorder mechanism for imprinting starting and quitting time upon the time card 1 in spaced relation proportionate to the elapsed time period forms no part of the present invention. There are, however, at the present time upon the market, several devices which perform this imprinting operation quite successfully. It is only necessary to add thereto, automatically moving stops or gages, traveling in unison with the clock work movement of the time recording apparatus, whereby the operator is permitted to insert his time card to a greater or less extent when making the registration. Suitable gages or stops to be manually set from day to day may be provided in conjunction with such imprinting apparatus to insure the imprint being placed in the proper column corresponding to the day of the week, and morning or afternoon as the case may be. It will be understood that inasmuch as such time recorder apparatus forms no part of the present invention, it is mentioned here merely for illustrative purposes and with no intent of limiting or restricting the present invention or system to the particular means and mechanism described for imprinting the time, but the system and calibrating means herein described may be employed with any suitable type of apparatus which will imprint, mark, indent or otherwise register successive time indications in spaced relation proportionate to the period of elapsed time. Moreover, the particular form of time card herein shown is not essential to the successful operation of the invention, but any suitable time sheet, whether arranged in multiple columns or a single column or otherwise, wherein the time imprint registrations occur in spaced relation proportionate to the elapsed time period may be computed and the monetary value of such period instantaneously ascertained as hereindescribed.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprises the preferred form of several modes of putting the invention into effect, and the invention is therefore claimed in any of its forms or modifications within the legitimate and valid scope of the appended claims.

Having thus described my invention, I claim:

1. In an elapsed time calculator, a series of scale members, relatively fixed in relation with each other and extending longitudinally in spaced parallel and transversely inclined relation, the outer edge portions of the members having monetary scales thereon terminating in spaced relation with the extremities of the members, and a record sheet having time records to be measured by said scales in units of monetary value, the sheet being insertible in the space between adjacent scale members, and movable to and fro in relation therewith to register different portions of the sheet with the zero indications of the scales.

2. In an elapsed time calculator, a support, a series of scale members extending longitudinally of the support and arranged in spaced parallel relation and transversely inclined with relation to the support, the outer edge portions of the members having scales thereon and being laterally deflected so as to present the scales in a plane more nearly approaching the plane of the support, and a record sheet having time records to be measured by said scales in units of monetary value, the sheet being insertible in the space between adjacent scale members.

3. In an elapsed time calculator, a supporting frame, a series of scale members mounted therein, in spaced parallel and transversely inclined relation, the outer edges of the scale members having series of graduations thereon, beginning at a mid length point whereby the scale extends beyond the initial graduation of the series permitting a record sheet having time indications thereon to be shifted both longitudinally and transversely intermediate adjacent scales to present different indications upon the record sheet in registry with the initial graduations of the series.

4. In an elapsed time calculator for determining money value equivalents of time periods represented by proportionately spaced indications upon a time record sheet, a series of lineal measuring scales graduated in units of monetary values at different rates per time unit, a mounting for the scales in which the scales are interconnected in parallel spaced relation, and between which the record sheet is insertable and slidable longitudinally and transversely in relation with the scales, the scales being mounted to permit the adjustment of the record sheet beyond the zero points of the graduations a distance approximately equivalent to the lineal range of time indications upon the sheet to permit the time indications on different portions of the sheet to be registered with the zero graduation of any selected scale.

5. In an elapsed time calculator, a unitary slotted structure comprising a series of parallel measuring scales arranged in spaced relation to afford intermediate slots through which record sheets may be introduced intermediate any two adjacent scales, for slidingly adjustable movement both longitudinally and transversely in relation with the scales, said scales being provided with a series of graduations adjacent to the intervening slots and of less length than the scales, ungraduated portions of which extend beyond the zero point of the series of graduations to permit indications adjacent either extremity of the record sheet to be registered with the zero graduation of the scale without reversal of the sheet.

In testimony whereof, I have hereunto set my hand this 1st day of April A. D. 1922.

WILLIAM J. LOVE, Jr.

Witnesses:
W. D. ANSPACH,
G. C. HELMIG.